United States Patent
Lin et al.

(10) Patent No.: US 9,451,481 B2
(45) Date of Patent: Sep. 20, 2016

(54) CELL DEVICE FOR MULTI-NETWORK COMMUNICATION

(71) Applicant: Cellco Partnership, Basking Ridge, NJ (US)

(72) Inventors: Te-Sheng Lin, Cresskill, NJ (US); John Gu, Rockaway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 363 days.

(21) Appl. No.: 14/087,108

(22) Filed: Nov. 22, 2013

(65) Prior Publication Data

US 2015/0146682 A1      May 28, 2015

(51) Int. Cl.
*H04W 24/04* (2009.01)
*H04W 48/06* (2009.01)
*H04W 48/18* (2009.01)

(52) U.S. Cl.
CPC ............. *H04W 24/04* (2013.01); *H04W 48/06* (2013.01); *H04W 48/18* (2013.01)

(58) Field of Classification Search
CPC .... H04W 24/04; H04W 48/06; H04W 48/18
See application file for complete search history.

(56) References Cited

U.S. PATENT DOCUMENTS

| | | | | |
|---|---|---|---|---|
| 7,702,357 B2* | 4/2010 | Yam | ...................... | H04W 36/14 370/338 |
| 2010/0128708 A1* | 5/2010 | Liu | .................... | H04W 36/0022 370/338 |
| 2013/0072167 A1* | 3/2013 | Aguirre | ................. | H04W 48/10 455/414.1 |
| 2013/0073388 A1* | 3/2013 | Heath | ..................... | G06Q 50/01 705/14.53 |
| 2013/0079004 A1* | 3/2013 | Singhal | ................... | H04W 4/02 455/435.1 |

OTHER PUBLICATIONS

Ben Drawbaugh, "An Inside Look at a Verizon FiOS Super Headend and Video Hub", www.engadget.com/2009/12/17/an-inside-look-at-a-verizon-fios-super-headend-and-video-hub/, Dec. 17, 2009, 11 pages.
Wikipedia, "Backhaul (telecommunications)", http://en.wikipedia.org/w/index.php?title=Backhaul_(telecommunications)&oldid=579062823, Oct. 28, 2013, 6 pages.
Ohayon et al., "Cellular Bonding", broadcastengineering.com/eng/cellular_bonding, Feb. 1, 2012, 7 pages.
Wikipedia, "Femtocell", http://en.wikipedia.org/w/index.php?title=Femtocell&oldid=578132437, Oct. 21, 2013, 11 pages.
Wikipedia, "Passive optical network", http://en.wikipedia.org/w/index.php?title=Passive_optical_network&oldid=580501645, Nov. 6, 2013, 10 pages.
Wikipedia, "Picocell", http://en.wikipedia.org/w/index.php?title=Picocell&oldid=575067674, Sep. 29, 2013, 2 pages.

\* cited by examiner

*Primary Examiner* — Andrew Lai
*Assistant Examiner* — Sumitra Ganguly

(57) ABSTRACT

A device is configured to receive a request to provide data traffic associated with a user device. The device is configured to determine network information associated with a set of networks. The device may be associated with a small cell long term evolution ("LTE") network, which may connect to the set of networks. The set of networks may include a macro cell LTE network and a fiber optic network. The network information may include information that identifies a condition of the set of networks. The device is configured to identify a particular network, of the set of networks, based on the network information, and provide the data traffic, via the small cell LTE network and the particular network, based on identifying the particular network.

20 Claims, 9 Drawing Sheets

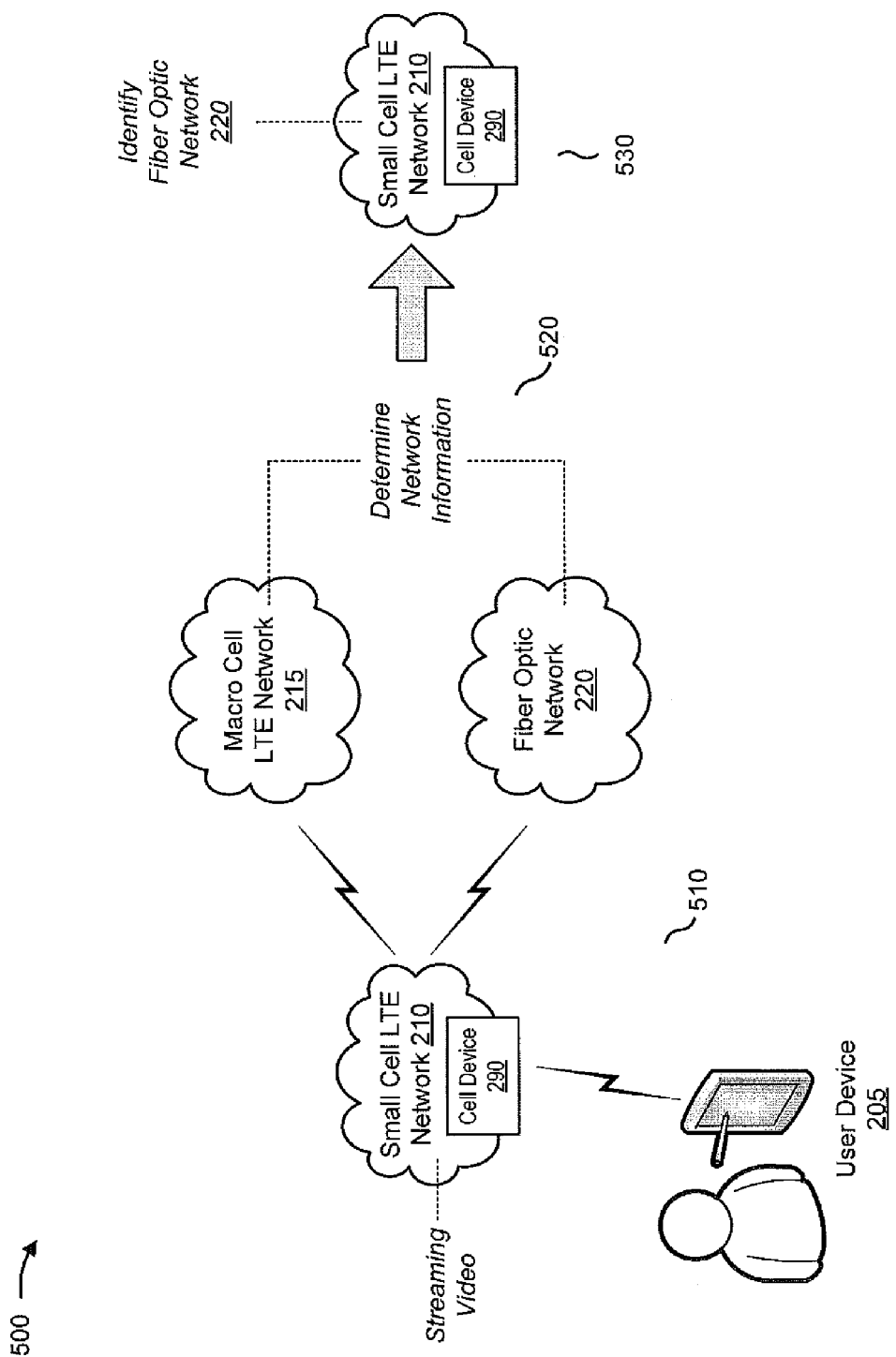

CELL DEVICE FOR MULTI-NETWORK COMMUNICATION

BACKGROUND

A service provider (e.g., a telephone provider, a cellular provider, a cable television provider, etc.) may provide a service to one or more user devices via a network.

BRIEF DESCRIPTION OF THE DRAWINGS

FIGS. 5A-5C are diagrams of an example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A service provider (e.g., a telecommunications service provider) may provide one or more services to a set of user devices via a set of networks. For example, the set of networks may include a macro cell long term evolution ("LTE") network. A user device may receive and/or transmit data traffic via the macro cell LTE network, including telephone calls, videos, emails, SMS text messages, or the like, while mobile (e.g., while connected to base stations associated with the macro cell LTE network).

The set of networks may also include a fiber optic network. The fiber optic network may be superior to the macro cell LTE network in some respects (e.g., may be associated with greater bandwidth than the macro cell LTE network, greater upload and/or download speed than the macro cell LTE network, etc.). Additionally, the fiber optic network may offer services not available through the macro cell LTE network, such as access to high-definition content (e.g., associated with a multichannel video programming distributor ("MVPD"), a cable television provider, video on demand service, audio on demand service, gaming on demand service, etc.). However, providing access to the fiber optic network may be expensive for the service provider. For example, building the fiber optic network, to each premises associated with customers of the service provider (e.g., providing the last leg of service), may be so costly as to be prohibitive. Further, for those premises connected to the fiber optic network, the user device may only access the fiber optic network when located near the premises (e.g., only when connected to a device associated with the premises).

Implementations described herein may allow a user device to receive the last leg of a fiber optic network by connecting to a cell device associated with a small cell LTE network. Additionally, implementations described herein may permit the cell device to transmit information via one network or the other (e.g., via the fiber optic network or a macro cell LTE network depending on network information associated with the fiber optic network and/or the macro cell LTE network).

Figure 1:
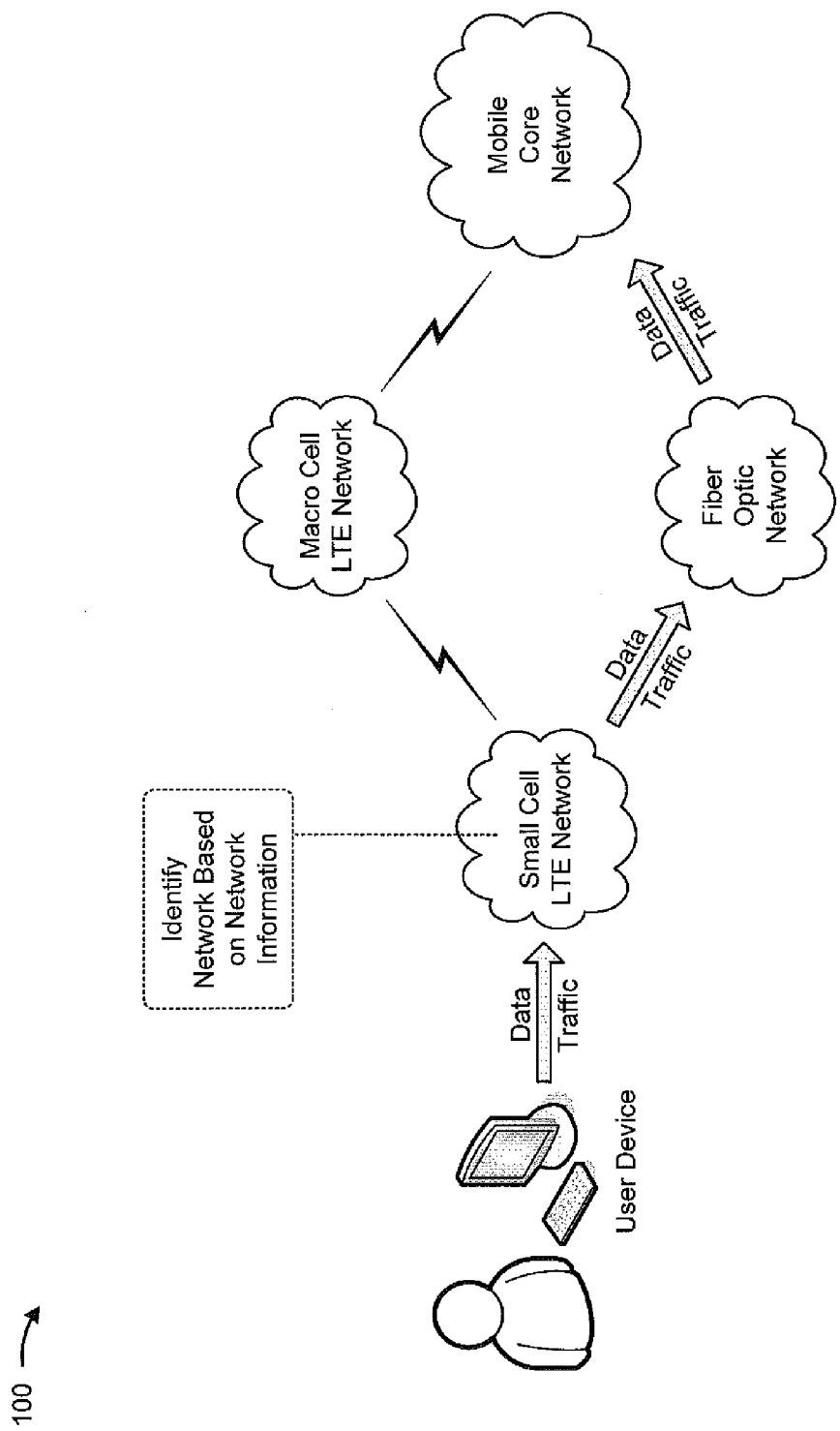
FIG. 1 is a diagram of an overview of an example implementation described herein.

FIG. 1 is a diagram of an overview of an example implementation 100 described herein. As shown in FIG. 1, example implementation 100 may include a user device and a set of networks, including a small cell LTE network, a macro cell LTE network, a fiber optic network, and a mobile core network.

As shown in FIG. 1, the user device may connect to the small cell LTE network via a wireless connection (e.g., by connecting wirelessly to a cell device associated with the small cell LTE network). The user device may transmit or receive data traffic, which may include calls (e.g., voice calls, video calls, etc.), media streaming (e.g., video streaming, audio streaming, etc.), emails, short message service ("SMS") text messages, or the like. The cell device (e.g., associated with the small cell LTE network) may gather network information associated with the macro cell LTE network, the fiber optic network, and/or the mobile core network. The network information may include information that identifies a condition (e.g., a status, a quality, etc.) of one or more of the networks and/or associated devices (e.g., bandwidth associated with the networks, congestion associated with the networks, operational status of the networks, etc.).

Based on the network information, assume that the cell device identifies the fiber optic network as the network, of the set of networks, to provide the data traffic associated with the user device (e.g., the cell device may determine to provide the data traffic via the fiber optic network instead of the macro cell LTE network based on bandwidth associated with the networks, congestion associated with the networks, operational status of the networks, etc.). Based on identifying the fiber optic network, the cell device may provide the data traffic via the fiber optic network. In this manner, the cell device may determine a network, of the set of networks, to provide the data traffic.

While the description to follow will describe the networks in terms of an LTE network and a fiber optic network, the description is not limited to an LTE network and/or fiber optic network. For example, in some implementations, the networks may include a code division multiple access ("CDMA") network, a global system for mobile communications ("GSM") network, a 3 G network, or the like.

Figure 2A:
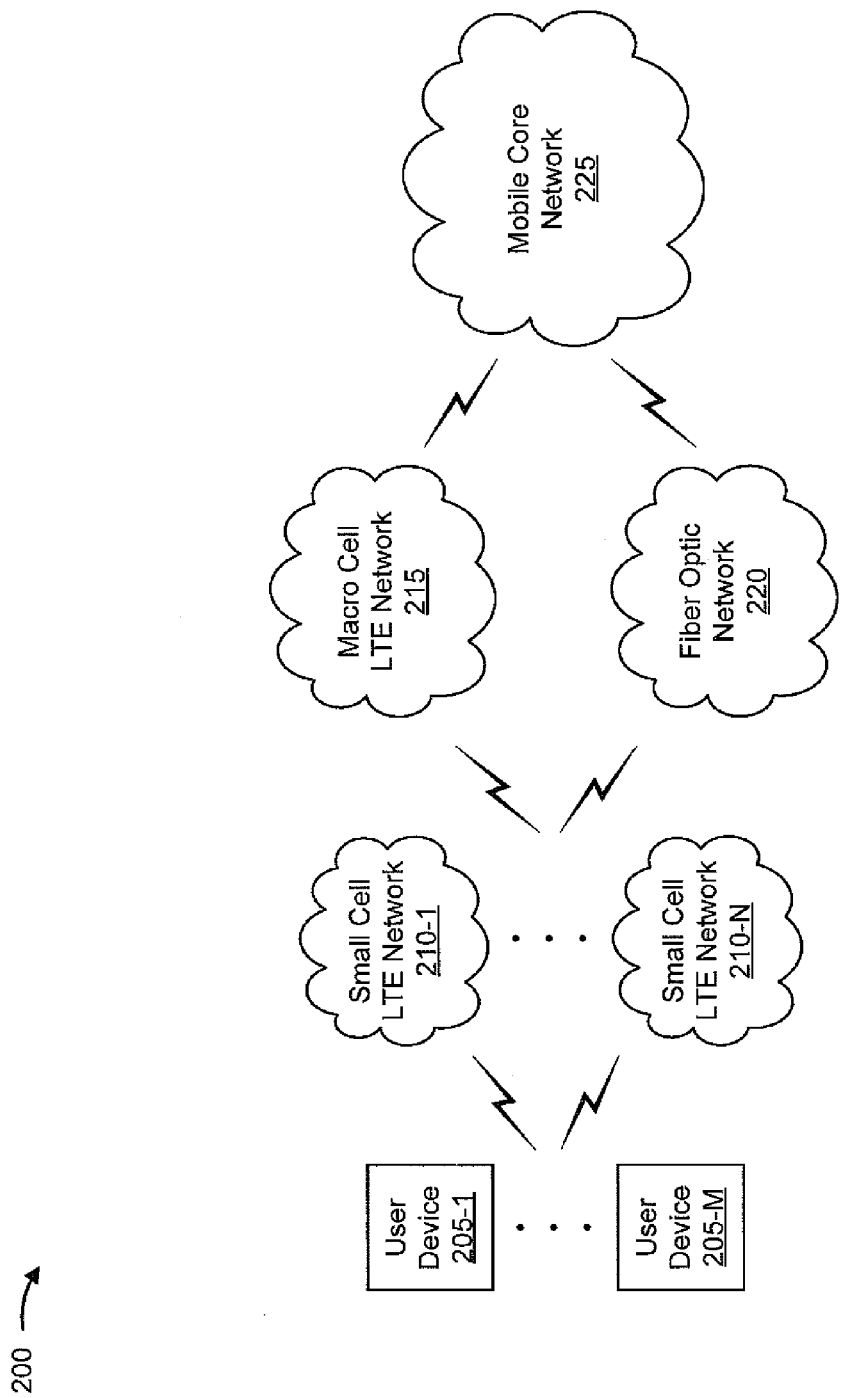
FIGS. 2A-2B are diagrams of an example environment in which systems and/or methods described herein may be implemented.
Figure 2B:
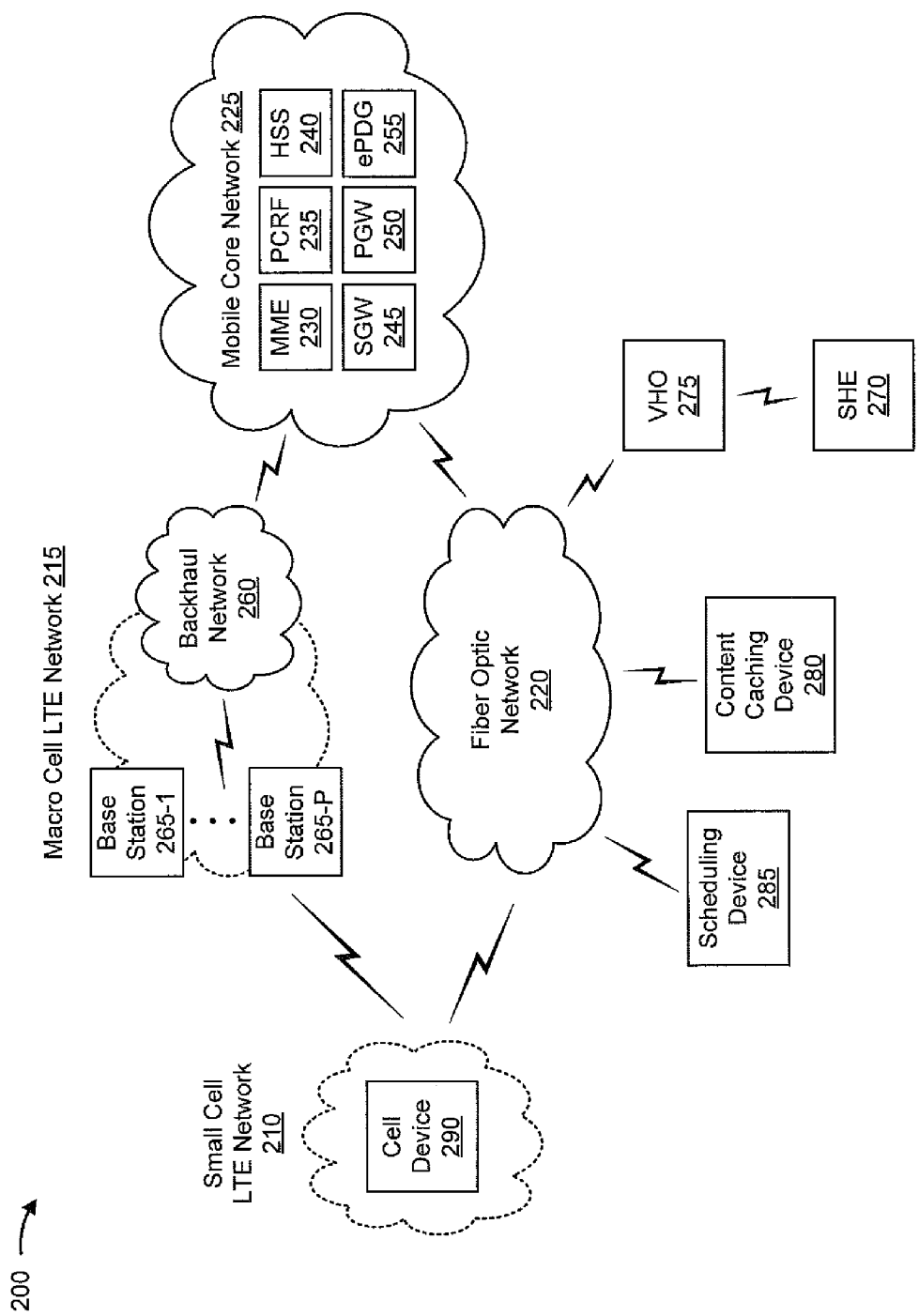

FIGS. 2A-2B are diagrams of an example environment 200 in which systems and/or methods described herein may be implemented. As shown in FIG. 2A, environment 200 may include user devices 205-1 . . . 205-M (M≥1) (hereinafter referred to collectively as "user devices 205," and individually as "user device 205"), small cell LTE networks 210-1 . . . 210-N (N≥1) (hereinafter referred to collectively as "small cell LTE networks 210," and individually as "small cell network 210"), macro cell LTE network 215, fiber optic network 220, and mobile core network 225.

User device 205 may include a device capable of receiving and/or transmitting data traffic via a network (e.g., small cell LTE network 210, macro cell LTE network 215, fiber optic network 220, etc.). For example, user device 205 may include a mobile telephone (e.g., a smartphone, a radiotelephone, etc.), a computing device (e.g., a desktop computer, a laptop computer, a tablet computer, a handheld computer, etc.), a personal gaming system, or a similar device. In some implementations, user device 205 may include a device capable of connecting other user devices 205 to the network, such as a router (e.g., a 4 G LTE router), a mobile hotspot, a gateway (e.g., a machine-to-machine gateway), a modem (e.g., a 4 G LTE universal serial bus ("USB") modem), or a similar device. Additionally, or alternatively, user device 205 may include a device capable of receiving and/or transmitting data traffic associated with a premises, such as a sensor (e.g., a motion sensor, a heat sensor, etc.), an appliance (e.g., a kitchen appliance, a bathroom appliance, etc.), a lighting device, a garage door opener, a device associated with a security system (e.g., a camera, a microphone, etc.), or a similar device. In some implementations, user device 205 may include a wearable device (e.g., a computing device that is associated with clothing and/or accessories), such as a wristband, a watch, a bracelet, glasses, etc. In some implementations, the wearable device may connect (e.g., via a wired and/or wireless connection) to another user device 205, such as a smartphone.

In some implementations, user device 205 may be associated with one or more applications, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a context-aware application, a location-based application (e.g., a global positioning system ("GPS")-based application, an indoor positioning system ("ISP")-based application, etc.), a blogging application, and/or other types of applications. In some implementations, user device 205 may be capable of connecting to small cell LTE network 210 (e.g., via a wired and/or wireless connection). For example, user device 205 may be associated with a transmitter, a receiver, a transceiver, or the like, to receive information from and/or transmit information to small cell LTE network 210. Additionally, or alternatively, user device 205 may be capable of connecting to another device (e.g., a wireless router, a wireless modem, etc.) that, in turn, is capable of connecting to small cell LTE network 210. In some implementations, user device 205 may connect to small cell LTE network 210 via a network associated with a single home dwelling unit, a multi-home dwelling unit, or the like, such as an Ethernet network (e.g., a wired cats network), a multimedia over coax alliance ("MoCA") network, a power line communication network (e.g., a HomePlug network), a home phoneline networking alliance ("HPNA") network, a short range and/or midrange network (e.g., associated with ZigBee, Z-wave, etc.), or a similar network.

Small cell LTE network 210 may include a radio access network ("RAN") associated with one or more cell devices. In some implementations, a cell device may be associated with a small cell, such as a microcell, a picocell, a femtocell, an enterprise femtocell, or a similar cell. In some implementations, small cell LTE network 210 may receive information from and/or transmit information to macro cell LTE network 215 and/or fiber optic network 220.

Macro cell LTE network 215 may include a RAN associated with one or more base stations. In some implementations, a base station may include an evolved Node B ("eNB") via which user device 205 may communicate with mobile core network 225.

Fiber optic network 220 may include a network of two or more devices that transmit and/or receive information (e.g., data traffic) via optical fibers. In some implementations, fiber optic network 220 may include one or more network interface devices, such as an optical network terminal ("ONT"), an optical line terminal ("OLT"), or the like. Additionally, or alternatively, fiber optic network 220 may include a beam splitter (e.g., an optical splitter), an optical multiplexer, an optical demultiplexer, an optical amplifier, or the like.

Mobile core network 225 may include a network of one or more devices to provide a service (e.g., a telecommunications service, a data service, etc.) to user devices 205. For example, mobile core network 225 may manage authentication, session initiation, data traffic control, charging, account information, or the like.

FIG. 2B shows portions of environment 200 in more detail. As shown in FIG. 2B, environment 200 may also include a mobility management entity device 230 (hereinafter referred to as "MME 230"), a policy and charging rules function ("PCRF") server 235 (hereinafter referred to as "PCRF 235), a home subscriber server ("HSS") 240 (hereinafter referred to as "HSS 240"), a serving gateway 245 (hereinafter referred to as "SGW 245"), a packet data network ("PDN") gateway 250 (hereinafter referred to as "PGW 250"), an evolved packet data gateway 250 (hereinafter referred to as "ePDG 255"), a backhaul network 260, base stations 265-1 . . . 265-P (P≥1) (hereinafter referred to collectively as "base stations 265" and individually as "base station 265"), super headend device 270 (hereinafter referred to as "SHE 270"), video hub office device 275 (hereinafter referred to as "VHO 275"), content caching device 280, scheduling device 285, and cell device 290.

MME 230 may include one or more computation and/or communication devices that gather, process, search, store, and/or provide information in a manner described herein. In some implementations, MME 230 may perform operations relating to authentication of user device 205. Additionally, or alternatively, MME 230 may facilitate the selection of a SGW 245 and/or a PGW 250 to serve data traffic to and/or from user device 205. MME 230 may perform an operation associated with handing off user device 205 from a first base station 265 to a second base station 265 when user device 205 is transitioning from a cell associated with the first base station 265 to a cell associated with the second base station 265. Additionally, or alternatively, MME 230 may select another MME (not pictured), to which user device 205 may be handed off (e.g., when user device 205 moves out of range of MME 230).

PCRF server 235 may include one or more server devices, or other types of computation and/or communication devices, that gather, process, search, store, and/or provide information in a manner described herein. In some implementations, PCRF server 235 may establish quality of service and charging (e.g., packet accounting) rules for a communication session based on committed quality of service levels per subscriber, per user device, per service type, per application, etc. PCRF server 235 may receive input regarding users, user devices 265, subscriptions, and/or applications. PCRF server 235 may create quality of service and charging policy rules for the communication session (e.g., for a user, a subscriber, a user device 265, an application, etc.), and may provide the policy rules to PGW 225, which may handle packets for the communication session with a particular user device 205 (e.g., running a particular application) based on the policy rules.

HSS 240 may include one or more server devices, or other types of computation and/or communication devices, that gather, process, search, store, and/or provide information in a manner described herein. For example, HSS 240 may manage, update, and/or store, in a memory associated with HSS 240, profile information associated with user device 205 that identifies applications and/or services that are permitted for use by and/or accessible by user device 205, information associated with a user of user device 205 (e.g., a username, a password, a personal identification number ("PIN"), etc.), subscription information, rate information, minutes allowed, bandwidth allocation policy information, and/or other information.

SGW 245 may include one or more computation and/or communication devices that gather, process, search, store, and/or provide information in a manner described herein. SGW 245 may include one or more data processing and/or data traffic transfer devices, such as a gateway, a router, a modem, a switch, a firewall, a NIC, a hub, a bridge, a proxy server, an OADM, or any other type of device that processes and/or transfers data traffic. In some implementations, SGW 245 may aggregate data traffic received from one or more base stations 265 associated with macro cell LTE network 215. SGW 230 may also aggregate data traffic received from fiber optic network 220. Additionally, or alternatively, SGW 230 may perform operations associated with handing off user device 265 to and/or from macro cell LTE network 215 and/or fiber optic network 220.

PGW 250 may include one or more computation and/or communication devices that gather, process, search, store, and/or provide information in a manner described herein. PGW 225 may include one or more data processing and/or data traffic transfer devices, such as a gateway, a router, a modem, a switch, a firewall, a NIC, a hub, a bridge, a proxy server, an optical add/drop multiplexer ("OADM"), or any other type of device that processes and/or transfers data traffic. In some implementations, PGW 250 may aggregate data traffic received from one or more SGWs 245, and may send the aggregated data traffic to macro cell LTE network 215 (e.g., via backhaul network 260), fiber optic network 220, etc. Additionally, or alternatively, PGW 250 may receive data traffic from macro cell LTE network 215 and/or fiber optic network 220, and may send the data traffic to user device 205 via SGW 245.

ePDG 255 may include one or more computation and/or communication devices that gather, process, search, store, and/or provide information in a manner described herein. ePDG 255 may include one or more data processing and/or data traffic transfer devices, such as a gateway, a router, a modem, a switch, a firewall, a NIC, a hub, a bridge, a proxy server, an OADM, or any other type of device that processes and/or transfers data traffic. In some implementations, ePDG 255 may transmit information to and/or receive information from one or more devices associated with untrusted networks (e.g., networks that are not associated with the 3$^{rd}$ Generation Partnership Project ("3 GPP")). In some implementations, ePDG 255 may connect fiber optic network 220 to mobile core network 225.

Backhaul network 260 may include one or more wired and/or wireless connections that provide data traffic between base stations 265 and mobile core network 225. For example, backhaul network 260 may include a cellular network, a public land mobile network ("PLMN"), an Ethernet network, and/or another network. Additionally, or alternatively, backhaul network 260 may include a local area network ("LAN"), a wide area network ("WAN"), a metropolitan area network ("MAN"), a telephone network (e.g., the Public Switched Telephone Network ("PSTN")), an ad hot network, an intranet, the Internet, a fiber optic-based network, and/or a combination of these or other types of networks.

Base station 265 may include one or more devices that receive, process, and/or transmit data traffic, such as audio, video, text, and/or other data, destined for and/or received from user device 205. In some implementations, base station 265 may include an eNB associated with macro cell LTE network 215 that receives data traffic from and/or sends data traffic to mobile core network 225 via PGW 250 and/or SGW 245. Base station 265 may send data traffic to and/or receive data traffic from user device 205 and/or small cell LTE network 210 via an air interface. In some implementations, base station 265 may communicate with user device 205 via cell device 290.

SHE 270 may include one or more devices capable of receiving, processing, and/or transmitting media information, such as television broadcasts, video broadcasts, audio broadcasts, etc. (e.g., as part of a cable television system). For example, SHE 270 may include a satellite dish, an antenna, a receiver, a transmitter, or the like. SHE 270 may provide the media information to VHO 275. VHO 275 may include one or more devices capable of receiving, processing, and/or transmitting the media information via a network (e.g., via macro cell LTE network 215, fiber optic network 220, etc.).

Content caching device 280 may include one or more devices capable of receiving, processing, storing, and/or transmitting media information. For example, content caching device 280 may include a computing device, such as a server, a desktop computer, a laptop computer, a tablet computer, a handheld computer, or the like. In some implementations, content caching device 280 may store a cache of the media information in a buffer (e.g., in a data structure associated with content caching device 280) for a period of time, and may provide the media information to user device 205 via a network (e.g., macro cell LTE network 215, fiber optic network 220, etc.). In some implementations, content caching device 280 may stream content associated with a multicast, a unicast, or the like. For example, content caching device 280 may stream content via enhanced multimedia broadcast multicast services ("eMBMS")

Scheduling device 285 may include a device capable of provisioning a network (e.g., macro cell LTE network 215, fiber optic network 220, etc.) to provide the media information. For example, scheduling device 285 may include a computing device (e.g., a server, a desktop computer, a laptop computer, a tablet computer, a handheld computer), a network device (e.g., a gateway, a base station, etc.), or a similar device. In some implementations, scheduling device 285 may include a broadcast video provisioning system ("BVPS").

Small cell LTE network 210 may include one or more cell devices 290. Cell device 290 may include one or more devices that receive, process, and/or transmit data traffic, such as media, audio, video, text, and/or other data traffic, destined for and/or received from user device 205 via macro cell LTE network 215 and/or fiber optic network 220. In some implementations, cell device 290 may be associated with a small cell, such as a microcell, a picocell, a femtocell, an enterprise femtocell, or a similar cell. Additionally, or alternatively, cell device 290 may include a base station, an access point (e.g., a wireless access point), a router (e.g., a 4G LTE broadband router), or the like. In some implementations, cell device 290 may send and/or receive data traffic via a wired connection (e.g., associated with fiber optic network 220). Additionally, or alternatively, cell device 290 may send and/or receive data traffic via an air interface (e.g., associated with macro cell LTE network 215).

Devices of environment 200 may interconnect via wired connections, wireless connections, or a combination of wired and wireless connections. The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
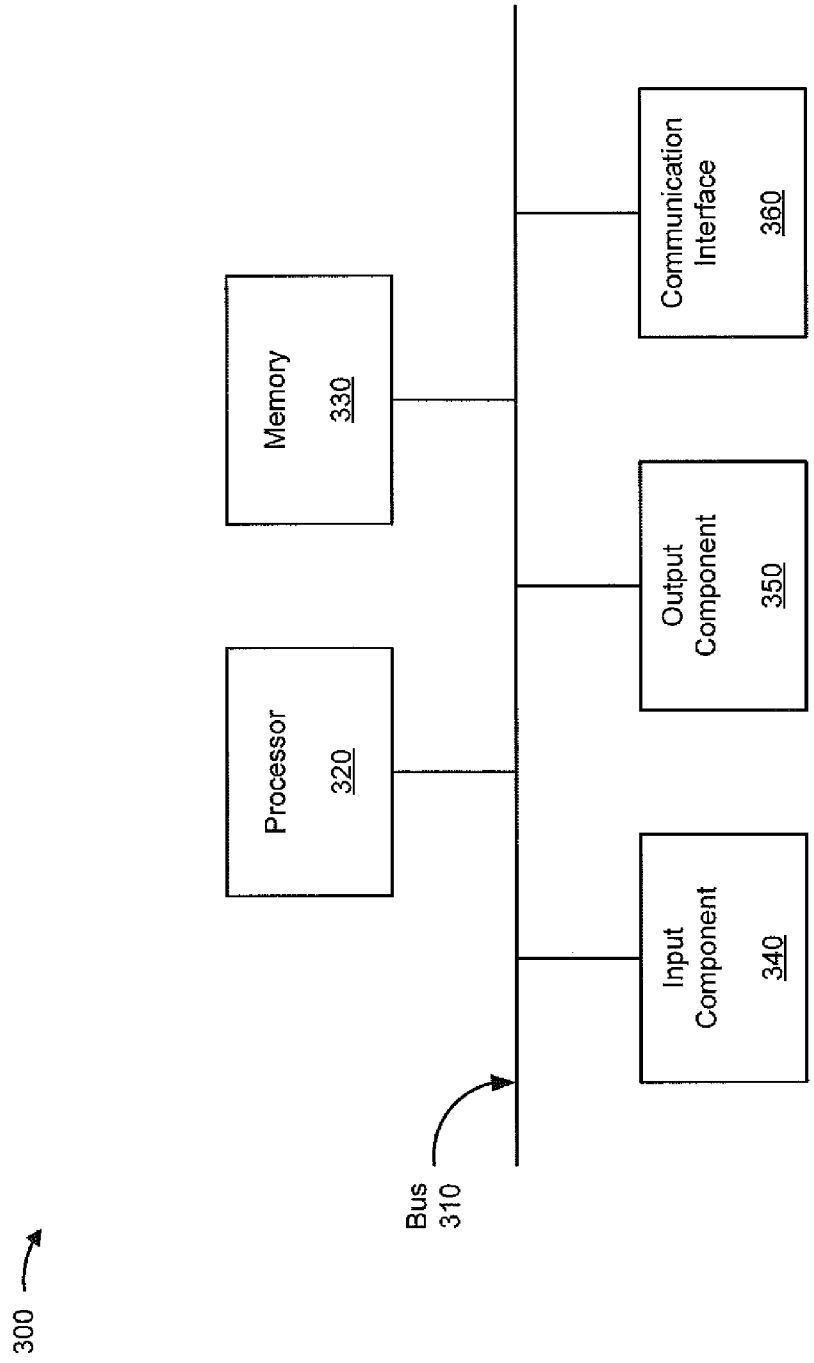
FIG. 3 is a diagram of example components of one or more devices of FIGS. 2A-2B.

FIG. 3 is a diagram of example components of a device 300. Device 300 may correspond to user device 205, MME 230, PCRF 235, HSS 240, SGW 245, PGW 250, ePDG 255, base station 265, SHE 270, VHO 275, content caching device 280, scheduling device 285, and/or cell device 290. Additionally, or alternatively, each of user device 205, MME 230, PCRF 235, HSS 240, SGW 245, PGW 250, ePDG 255, base station 265, SHE 270, VHO 275, content caching device 280, scheduling device 285, and/or cell device 290 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, a microphone, a motion sensor, a light sensor, a proximity sensor, an accelerometer, a gyroscope, a near field communication ("NFC") reader, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, a high-definition multimedia interface ("HDMI"), a mobile high definition link ("MHL") interface, a mobile audio/video interface (e.g., a SlimPort interface), a digital living network alliance ("DLNA") interface, a Bluetooth interface, a WiFi interface (e.g., a WiFi direct interface), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
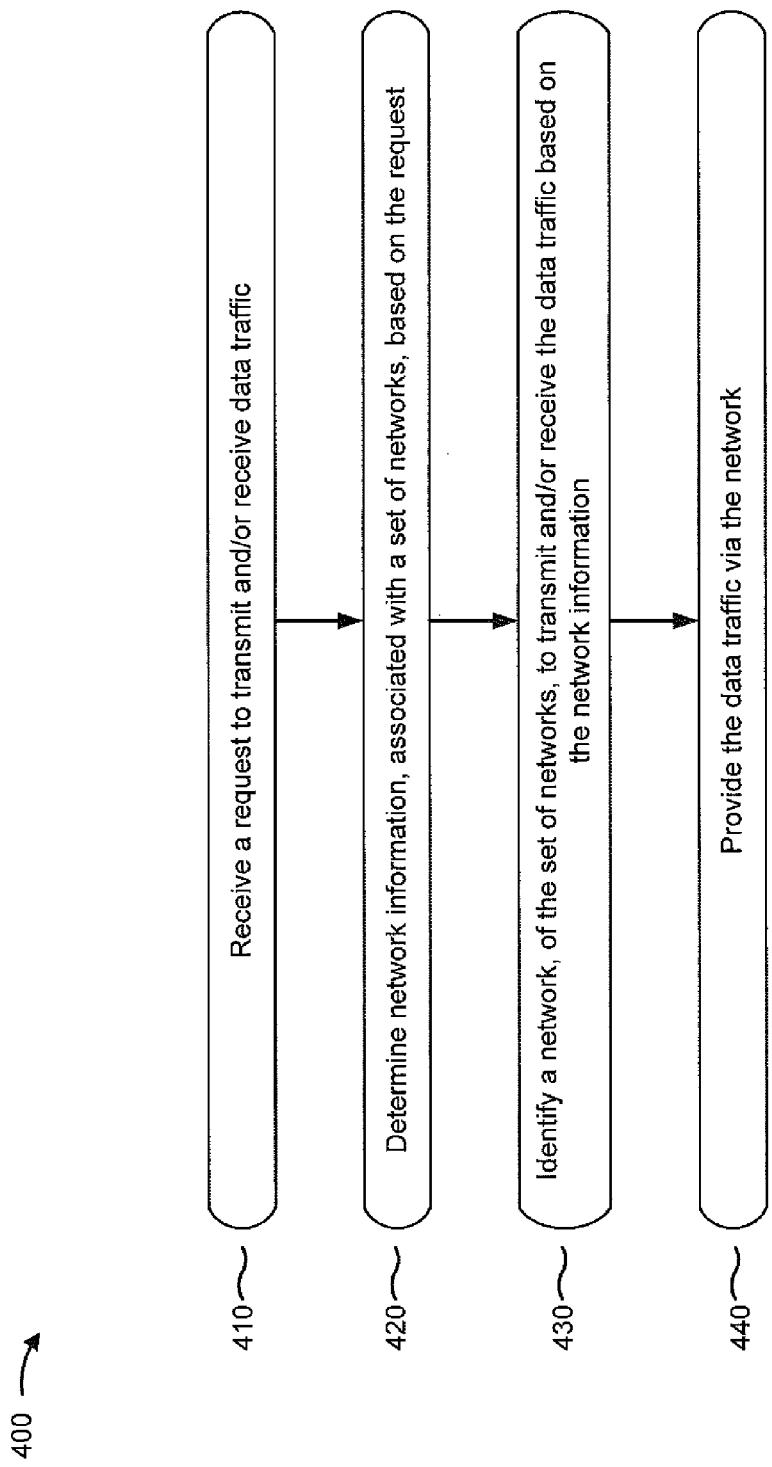
FIG. 4 is a flow chart of an example process for identifying a network to provide data traffic.

FIG. 4 is a flow chart of an example process 400 for identifying a network to provide data traffic. In some implementations, one or more process blocks of FIG. 4 may be performed by cell device 290. Additionally, or alternatively, one or more process blocks of FIG. 4 may be performed by another device or a group of devices separate from or including cell device 290, such as user device 205, MME 230, PCRF 235, HSS 240, SGW 245, PGW 250, ePDG 255, base station 265, SHE 270, VHO 275, content caching device 280, and/or scheduling device 285.

As shown in FIG. 4, process 400 may include receiving a request to transmit and/or receive data traffic (block 410). For example, cell device 290 may receive the request from user device 205. Additionally, or alternatively, cell device 290 may receive the request from one or more devices associated with LTE network 215 and/or fiber optic network 220 (e.g., base station 265, another cell device 290, etc.).

In some implementations, data traffic may include information transmitted and/or received via a network (e.g., macro cell LTE network 215, fiber optic network 220, mobile core network 225, backhaul network 260, etc.). For example, the data traffic may include calls (e.g., voice calls, video calls, video conferencing, etc.), media streaming (e.g., video streaming, audio streaming, etc.), peer-to-peer communications (e.g., instant messages, chats, files, etc.), emails, SMS text messages, website traffic, or the like. In some implementations, the data traffic may include a network packet. The network packet may include a portion of the data traffic formatted for a packet-switched network. The packet-switched network may include a network (e.g., small cell LTE network 210, macro cell LTE network 215, fiber optic network 220, mobile core network 225, backhaul network 260, etc.) that uses internet protocol ("IP") to receive and/or transmit the data traffic. For example, the packet switched network may include a network that uses IP version 4 ("IPv4"), IP version 6 ("IPv6"), or the like, to receive and/or transmit the data traffic.

In some implementations, cell device 290 may receive a request to transmit and/or receive data traffic associated with user device 205. In some implementations, cell device 290 may receive the request via session initiation protocol ("SIP"). SIP may include a communication protocol for creating, modifying, and/or terminating two-party (e.g., unicast) and/or multiparty (e.g., multicast) communication sessions.

In some implementations, cell device 290 may receive the request based on authenticating user device 205 (e.g., based on determining that user device 205 is authorized to connect to the network). For example, user device 205 may be associated with a device identifier. The device identifier may include one or more characters (e.g., letters, numbers, symbols, etc.) that uniquely identify user device 205, such as an international mobile subscriber identity ("IMSI"). In some implementations, the device identifier may be stored in a data structure associated with user device 205 (e.g., associated with a service identification module ("SIM") card). Based on the device identifier, cell device 290 may determine whether user device 205 is authorized to connect to the network. For example, cell device 290 may compare the device identifier to subscriber information associated with HSS 240.

As further shown in FIG. 4, process 400 may include determining network information, associated with a set of networks, based on the request (block 420). For example, cell device 290 may determine network information associated with macro cell LTE network 215, fiber optic network 220, or the like.

In some implementations, the network information may include information that identifies a condition (e.g., a status, a quality, etc.) of one or more networks and/or associated devices. For example, the network information may identify a condition of macro cell LTE network 215, fiber optic network 220, and/or mobile core network 225. Additionally, or alternatively, the network information may identify a condition of user device 205, cell device 290, or the like.

In some implementations, the network information may include information that identifies whether a particular network (e.g., macro cell LTE network 215, fiber optic network 220, etc.) is congested (e.g., is associated with a quantity of data traffic likely to degrade a quality of service associated with the particular network). For example, the network information may identify whether one or more network devices (e.g., associated with macro cell LTE network 215, fiber optic network 220, etc.) are associated with a quantity of data traffic greater than a threshold quantity of data traffic. In some implementations, the one or more networks may include a packet-switched network, and the network information may identify whether one or more network devices are associated with queuing delay (e.g., a delay in an amount of time a network packet waits in a queue before being processed by the network device), packet loss (e.g., a measure of a quantity of network packets that do not reach their destination), or the like.

In some implementations, the network information may include information that identifies a bandwidth associated with a network (e.g., a measure of the number of bits available per unit of time), a throughput associated with the network (e.g., a measure of the number of bits successfully delivered per unit time), or the like.

In some implementations, the network information may include information that identifies a type of data traffic associated with a network. For example, the network information may identify a type of data traffic transmitted by and/or intended for user device 205 (e.g., whether the data traffic is associated with a voice call, a video, an email, an SMS text message, etc.).

In some implementations, the network information may include information that identifies an operational status of one or more network devices. For example, the network information may identify whether the one or more network devices (e.g., cell devices 290) are powered on, powered off, operating normally, in a failed state, etc.

In some implementations, the network information may include information that identifies a location of one or more network devices (e.g., cell device 290, base station 265, content caching device 280, scheduling device 285, etc.). Additionally, or alternatively, the network information may identify which network, of the set of networks, is associated with a particular network device. For example, the network information may identify whether the network device is associated with macro cell LTE network 215, fiber optic network 220, mobile core network 225, backhaul network 260, or the like.

In some implementations, the network information may include information that identifies a location of user device 205. For example, the network information may identify a geographic location of user device 205. Additionally, or alternatively, the network information may identify a particular network device connected to user device 205. For example, user device 205 may connect to a network via cell device 290, and the network information may identify a location of cell device 290.

In some implementations, the network information may include information that identifies a billing scheme associated with user device 205. For example, the network information may identify whether a user associated with user device 205 is to be billed for use of a particular network (e.g., macro cell LTE network 215, fiber optic network 220, etc.). Additionally, or alternatively, the network information may include information that identifies a subscription plan associated with user device 205. For example, the network information may identify one or more services available to user device 205 (e.g., based on the subscription plan).

As further shown in FIG. 4, process 400 may include identifying a network, of the set of networks, to transmit and/or receive the data traffic based on the network information (block 430). For example, based on the network information, cell device 290 may identify whether to transmit and/or receive the data traffic (e.g., data traffic associated with user device 205) via macro cell LTE network 215, fiber optic network 220, or the like.

In some implementations, cell device 290 may identify the network based on an operational status associated with the set of networks. For example, the set of networks may include a first network (e.g., macro cell LTE network 215) and a second network (e.g., fiber optic network 220). Cell device 290 may determine that one or more network devices associated with the second network are not operational (e.g., so as to prohibit data traffic, associated with user device 205, from being transmitted via the second network). Based on determining that the second network is not operational, cell device 290 may identify the first network as the network to provide the data traffic associated with user device 205. In this manner, cell device 290 may use the first network as a backup (e.g., a failsafe) to the second network.

In some implementations, cell device 290 may identify the network based on network congestion (e.g., associated with the set of networks). For example, a first network (e.g., macro cell LTE network 215) may be congested (e.g., may be associated with a quantity of data traffic likely to degrade a quality of service associated with the first network), and a second network (e.g., fiber optic network 220) may not be congested (e.g., may not be associated with a quantity of data traffic likely to degrade a quality of service associated with the second network). Based on the congestion of the first network and the congestion of the second network, cell device 290 may identify the second network (e.g., fiber optic network 220) as the network to transmit and/or receive data traffic associated with user device 205. In this manner, cell device 290 may alleviate congestion associated with the set of networks, and may increase a quantity of user devices 205 associated with the set of networks (e.g., by allowing additional user devices 205 to send and/or receive data traffic via an uncongested network).

In some implementations, cell device 290 may identify the network based on a type of data traffic (e.g., associated with user device 205). For example, cell device 290 may identify the network based on whether the data traffic is associated with a voice call, a video call, streaming media (e.g., audio, video, etc.), an email, an SMS text message, website traffic, or the like. In some implementations, cell device 290 may identify the network based on bandwidth associated with the type of data traffic. For example, the set of networks may include a first network (e.g., macro cell LTE network 215) and a second network (e.g., fiber optic network 220). The second network may be associated with greater bandwidth than bandwidth associated with the first network. User device 205 may request data traffic (e.g., a high-definition video stream) that requires a particular amount of bandwidth (e.g., to ensure a quality of service). Based on the particular amount of bandwidth, cell device 290 may identify the second network as the network to provide the data traffic (e.g., based on the second network being associated with a greater bandwidth than bandwidth associated with the first network). In this manner, cell device 290 may ensure a quality of service by causing data traffic of a particular type to be provided via a network associated with sufficient bandwidth (e.g., a quantity of bandwidth necessary for delivery of the particular type of data traffic).

In some implementations, cell device 290 may identify the network based on the locations of one or more network devices associated with data traffic (e.g., based on determining with which network the one or more network devices are associated). For example, SHE 270 and/or VHO 275 may be associated with a particular network (e.g., fiber optic network 220). User device 205 may request to receive streaming video associated with SHE 270 and/or VHO 275. Based on the request, and based on determining that SHE 270 and/or VHO 275 are associated with the particular network (e.g., fiber optic network 220), cell device 290 may identify the particular network as the network to provide the streaming video. In this manner, cell device 290 may permit user device 205 to receive data traffic from and/or transmit data traffic to a particular network device (e.g., associated with a particular network).

In some implementations, cell device 290 may identify the network based on a power management scheme. The power management scheme may include a plan for powering down one or more network devices (e.g., associated with the set of networks) to conserve power. For example, cell device 290 may be associated with a business (e.g., a store, a shopping mall, a restaurant, etc.), and may offer access to one or more networks (e.g., fiber optic network 220) for users associated with the business (e.g., employees, customers, etc.). Based on the power management scheme, cell device 290 may power down (e.g., may turn off, may enter a low-power state, etc.) during non-business hours (e.g., when demand by the users associated with the business is expected to be minimal).

Cell device 290 may identify the network based on determining which cell devices 210 are available (e.g., powered on). For example, user device 205 may connect to a first cell device 290-1. The first cell device 290-1 may provide access to a first network (e.g., macro cell LTE network 215). A second cell device 290-2 may be associated with a business, and may provide access to a second network (e.g., fiber optic network 220). In some implementations, first cell device 290-1 may connect to second cell device 290-2 (e.g., via a wireless connection), and may provide data traffic, associated with user device 205, via the second network (e.g., by using second cell device 290-2 as a repeater). During non-business hours, first cell device 290-1 may determine that second cell device 290-2 is powered off (e.g., based on the power management scheme). Based on the determining that second cell device 290-2 is powered off, first cell device 290-1 may identify the first network as the network to transmit and/or receive data traffic associated with user device 205 (e.g., based on determining that access to the second network, via second cell device 290-2, is unavailable). In this manner, cell device 205 may permit one or more network devices to reduce power consumption, associated with the set of networks, while still maintaining access, by user device 205, to mobile core network 225.

In some implementations, cell device 290 may identify the particular network based on a user preference. The user preference may include an indication of which network, of the set of networks, cell device 290 is to provide the data traffic. In some implementations, the user preference may include a ranking of networks. For example, the user preference may indicate that cell device 290 may provide data traffic via fiber optic network 220, if available, and to provide the data traffic via macro cell LTE network 215 if fiber optic network 220 is not available. In some implementations, the user preference may be stored with other account information associated with the user (e.g., stored in a data structure associated with HSS 240). Additionally, or alternatively, cell device 290 may identify the particular network based on a user input. In this manner, cell device 290 may permit the user to determine which network, of the set of networks, to provide the data traffic.

In some implementations, cell device 290 may identify the network based on a location of user device 205. For example, cell device 290 may identify a first network (e.g., fiber optic network 220) as the network to provide data traffic associated with user device 205 when user device 205 is at a particular location (e.g., a user's home), and may identify a second network (e.g., macro cell LTE network 215) as the network to provide the data traffic when user device is at a different location (e.g., away from the user's home). In some implementations, the location may be associated with a business location (e.g., a store, a shopping mall, a restaurant, an office, etc.). Cell device 290 may identify the network based on determining that user device 205 is within a threshold distance of the business location. In some implementations, a billing device (e.g., a billing server) associated with the network (e.g., macro cell LTE network 215, fiber optic network 220, mobile core network 225, etc.) may track usage of the network for billing purposes.

As discussed herein, any one or more of the above factors may be used to identify the network, of the set of networks, to transmit and/or receive the data traffic based on the network information. In some implementations, cell device 290 may identify one or more of the factors based on user input by a user of a network (e.g., small cell LTE network 210, macro cell LTE network 215, fiber optic network 220, etc.), such as a network operator, a network administrator, or the like. In some implementations, cell device 290 may identify the network based on a score associated with the one or more factors. For example, cell device 290 may generate a score for each factor, may weight the scores (e.g., not all factors may be treated equally), and may combine the scores to determine a total score that is used to select the network. Additionally, or alternatively, cell device 290 may score each network (e.g., based on the one or more factors) of the set of networks, and may identify the network (e.g., by which to provide the data traffic) based on the scores associated with the networks.

As further shown in FIG. 4, process 400 may include providing the data traffic via the network (block 440). For example, cell device 290 may provide the data traffic, associated with user device 205, via the network identified by cell device 290.

In some implementations, cell device 290 may provide the data traffic to user device 205 and/or the network directly. In some implementations, cell device 290 may provide the data traffic to user device 205 and/or the network via another cell device 290 (e.g., associated with another small cell LTE network 210). For example, a first cell device 290-1 may receive data traffic from user device 205. First cell device 290-1 may provide the data traffic to a second cell device 290-2, and second cell device 290-2 may provide the data traffic to the network.

In some implementations, cell device 290 may provide the data traffic by the use of link aggregation. Link aggregation may include combining multiple links (e.g., a physical and/or logical component used to interconnect nodes in a network) in parallel to increase throughput, provide redundancy, or the like. For example, the data traffic may be associated with a high resolution video, and cell device 290 may provide the data traffic by use of channel bonding, cellular bonding (e.g., by use of multiple cell devices 290, multiple base stations 265, etc.), or the like.

In some implementations, cell device 290 may provide the data traffic by use of eMBMS. For example, the network may be an eMBMS network, and the data traffic may be associated with a streaming video (e.g., associated with SHE 270, VHO 275, etc.). The network may transmit the streaming video via eMBMS, to cell device 290, and cell device 290 may transmit the streaming video to user device 205.

In some implementations, one or more network devices may store the streaming video for a period of time. For example, the streaming video may be associated with a video on demand service. Content caching device 280 may receive the streaming video (e.g., associated with SHE 270, VHO 275, etc.), may store the streaming video, and may provide a portion of the streaming video (e.g., associated with a movie, a television program, etc.) to a particular user device 205 (e.g., via a unicast) based on a request by the particular user device 205 to receive the content. In some implementations, the video stream may be associated with real-time content (e.g., a newscast, a live sporting event, etc.). Content caching device 280 may receive the streaming video (e.g., associated with SHE 270, VHO 275, etc.), and may store the streaming video in a data structure (e.g., associated with content caching device 280) for a period of time before providing the streaming video (e.g., via a multicast) to user device 205. In this manner, content caching device 280 may store the streaming video (e.g., in a buffer) to reduce lag associated with the streaming video, to reduce jitter associated with the streaming video, or the like. In some implementations, scheduling device 285 may provision the network so that different streaming videos may be received by different network devices and/or different locations (e.g., to permit user device 205 to receive a particular video stream based on a location of user device 205, a location of cell device 290, or the like).

Although FIG. 4 shows example blocks of process 400, in some implementations, process 400 may include additional blocks, fewer blocks, different blocks, and/or differently arranged blocks than those depicted in FIG. 4. Additionally, or alternatively, two or more of the blocks of process 400 may be performed in parallel.

Figure 5B:
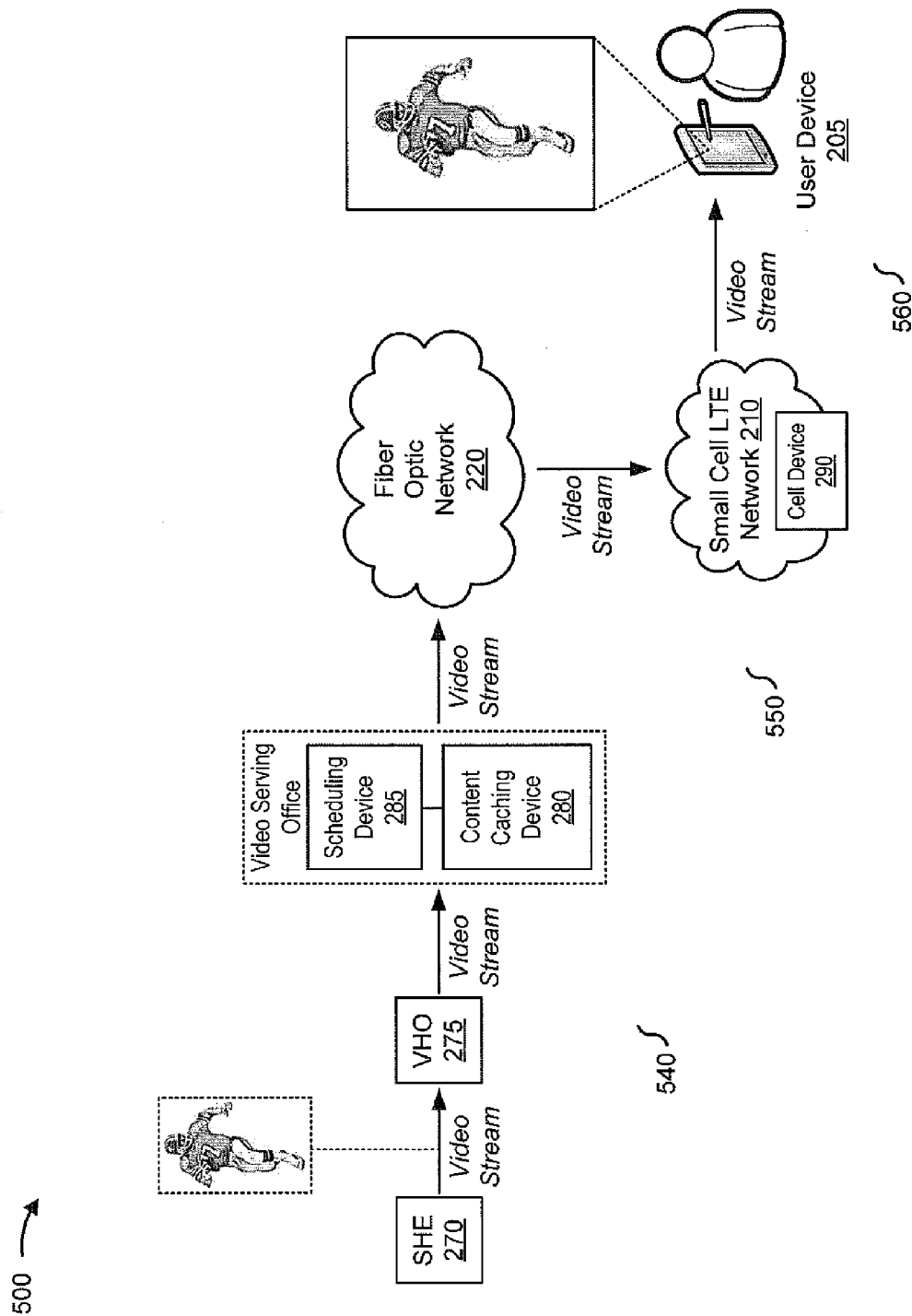
Figure 5C:
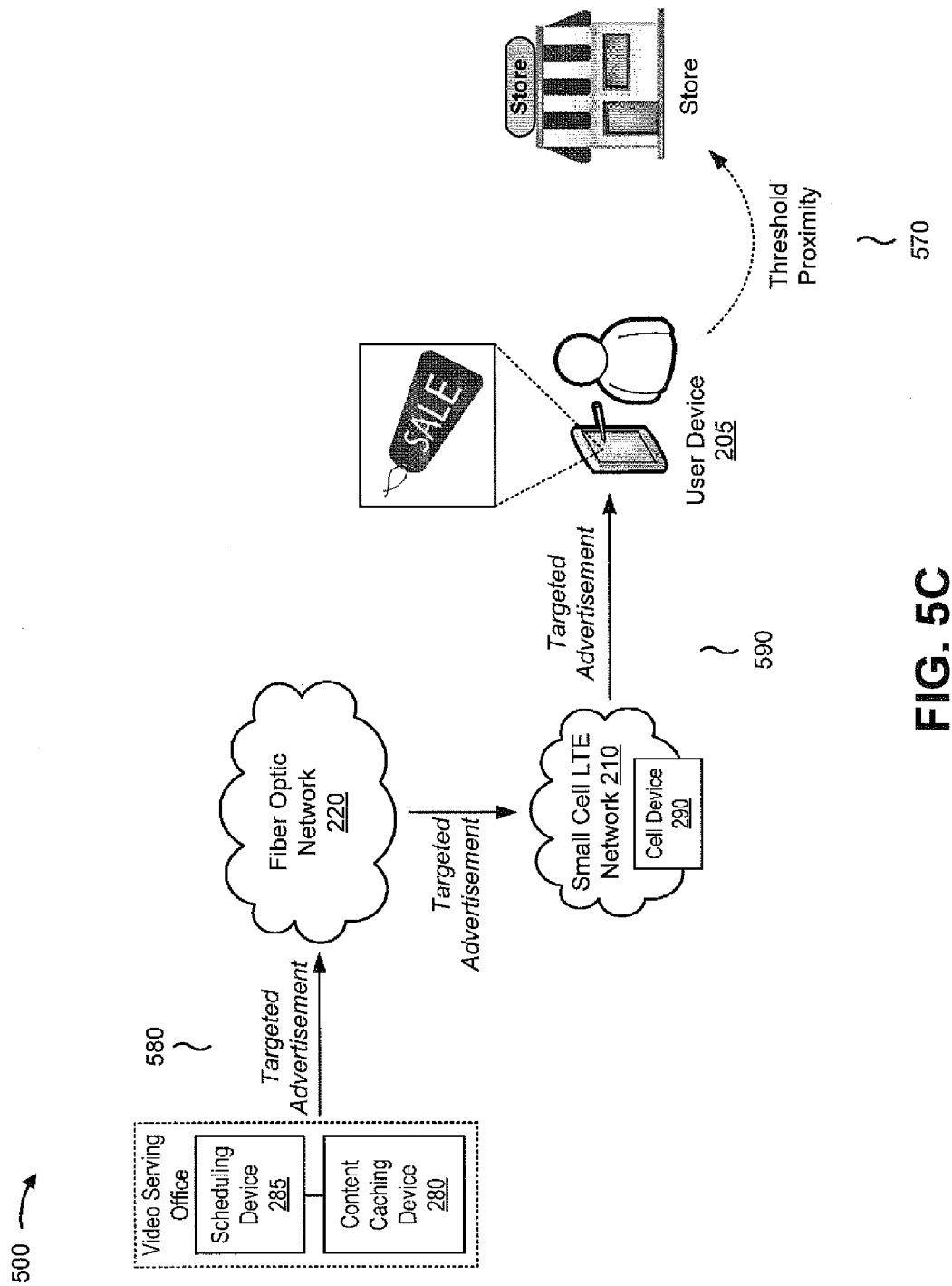

FIGS. 5A-5C are diagrams of an example implementation 500 relating to process 400 (FIG. 4). In example implementation 500, cell device 290 may connect (e.g., via a wireless connection) to macro cell LTE network 215 and (e.g., via a wired or wireless connection) to fiber optic network 220. Based on network information associated with macro cell LTE network 215 and (e.g., via a wired or wireless connection) to fiber optic network 220, cell device 290 may identify fiber optic network 220 as the network to provide data traffic (e.g., associated with a streaming video) to user device 205.

As shown in FIG. 5A, and by reference number 510, user device 205 may connect to cell device 290 (e.g., via a wireless connection). A user of user device 205 may provide user input indicating that user device 205 is to receive a streaming video (e.g., associated with a high definition television cable broadcast). Based on the user input, user device 205 may provide a request (e.g., via SIP) to cell device 290 to receive the streaming video.

As shown by reference number 520, cell device 290 may determine network information associated with macro cell LTE network 215 and fiber optic network 220. The network information may include a measure of bandwidth associated with macro cell LTE network 215, and a measure of bandwidth associated with fiber optic network 220. Based on the network information, cell device 290 may determine that fiber optic network 220 is associated with greater bandwidth than macro cell LTE network 215. Further, cell device 290 may determine that the bandwidth associated with fiber optic network 220 is sufficient for the streaming video. As shown by reference number 530, based on the network information, cell device 290 may identify fiber optic network 220 as the network to provide the streaming video.

As shown in FIG. 5B, and by reference number 540, SHE 270 may provide the video stream to VHO 275, and VHO 275 may provide the video stream to a video serving office. The video serving office may be associated with scheduling device 285 and content caching device 280. Content caching device 280 may store a cache of the video stream in a data structure (e.g., associated with content caching device 280). Scheduling device 285 may provision fiber optic network 220 for delivery of the video stream (e.g., may determine what network devices, including cell device 290, are to receive the video stream).

As shown by reference number 550, cell device 290 may receive the video stream via fiber optic network 220. Cell device 290 may provide the video stream to user device 205, as shown by reference number 560. User device 205 may display the video stream on a user interface associated with user device 205.

As shown in FIG. 5C, and by reference number 570, cell device 290 may determine that user device 205 is located within a threshold proximity of a store (e.g., that user device 205 is within the store, is near the store, etc.). As shown by reference number 580, scheduling device 285 may provision fiber optic network 220 to provide a targeted advertisement to user devices 205 within the threshold proximity (e.g., associated with the store). The targeted advertisement may include an advertisement (e.g., a commercial) for products associated with the store. Content caching device 280 may provide the targeted advertisement to cell device 290 via fiber optic network 220.

As shown by reference number 590, cell device 290 may provide the targeted advertisement to user device 205 based on the location of user device 205 (e.g., based on determining that user device 205 is within the threshold proximity). User device 205 may display the targeted advertisement on a user interface associated with user device 205.

As indicated above, FIGS. 5A-5C are provided merely as an example. Other examples are possible and may differ from what was described with regard to FIGS. 5A-5C.

Figure 6:
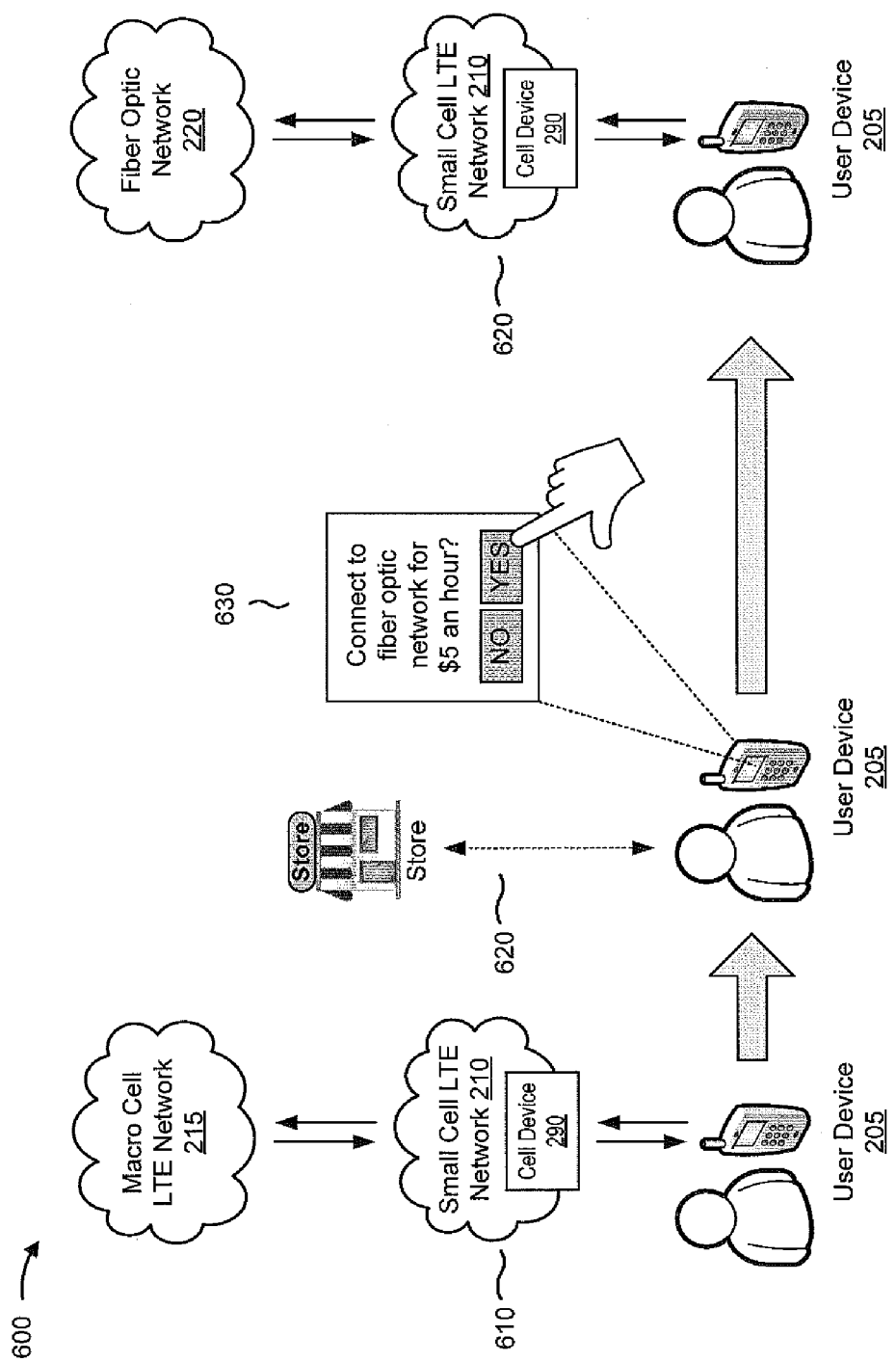
FIG. 6 is a diagram of another example implementation relating to the example process shown in FIG. 4.

FIG. 6 is a diagram of another example implementation 600 relating to process 400 (FIG. 4). In example implementation 600, cell device 290 may provide data traffic, associated with user device 205, based on user input.

As shown by reference number 610, cell device 290 may provide data traffic (e.g., associated with user device 205) via macro cell LTE network 215. As shown by reference number 620, a user of user device 205 may enter a store. The store may offer access to fiber optic network 220 for a price (e.g., $5 an hour). Fiber optic network 220 may offer greater bandwidth than macro cell LTE network 215.

As shown by reference number 630, cell device 290 may provide a notification to user device 205 indicating that user device 205 may connect to the network. The user may provide user input, via user device 205, to transmit and/or receive data traffic via fiber optic network 220. Based on the user input, cell device 290 may provide the data traffic via fiber optic network 220 (e.g., instead of macro cell LTE network 215). After a period of time, and possibly based on user input, cell device 290 may stop providing the data traffic via fiber optic network 220 (e.g., when the user leaves the store). A billing server (e.g., associated with fiber optic network 220, mobile core network 225, etc.) may bill an account, associated with the user, for use of fiber optic network 220.

As indicated above, FIG. 6 is provided merely as an example. Other examples are possible and may differ from what was described with regard to FIG. 6.

Implementations described herein may allow a cell device to provide the last leg of a fiber optic network, and to permit the cell device to selectively transmit data traffic via the fiber optic network or the LTE network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein. In some implementations, the user interfaces may be customizable by a device or a user. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
    one or more processors to:
        receive a request to provide data traffic associated with a user device;
        determine network information associated with a plurality of networks,
            the device being associated with a small cell long term evolution ("LTE") network,
            the small cell LTE network being wirelessly connected to the plurality of networks,
            the plurality of networks including a macro cell LTE network and a fiber optic network, and
            the network information including information that identifies a condition of the plurality of networks;
        identify a particular network, of the plurality of networks, based on the network information,
            the particular network being identified as the macro cell LTE network or the fiber optic network based on one or more factors,
            the one or more factors including whether the request is for a media stream,
            the particular network being identified as the fiber optic network based on the request being for the media stream,
                the media stream being stored in a content caching device; and
        provide the data traffic, via the small cell LTE network and the particular network, based on identifying the particular network.

2. The device of claim 1, where the one or more processors, when determining the network information, are to:
    determine that either the macro cell LTE network or the fiber optic network is not operational; and where the one or more processors, when identifying the particular network, are to:
  identify the particular network based on the one or more factors including the determination that either the macro cell LTE network or the fiber optic network is not operational.

3. The device of claim 1, where the one or more processors, when determining the network information, are to:
  determine a user preference for the particular network; and
  where the one or more processors, when identifying the particular network, are to:
    identify the particular network based on the one or more factors including the user preference.

4. The device of claim 1, where the one or more processors are further to:
  receive a user input; and
  where the one or more processors, when identifying the particular network, are to:
    identify the particular network based on the user input.

5. The device of claim 1, where the one or more processors, when determining the network information, are to:
  determine a location of the user device; and
  where the one or more processors, when identifying the particular network, are to:
    identify the particular network based on the location of the user device.

6. The device of claim 1, where the data traffic is a targeted advertisement;
  where the one or more processors, when determining the network information, are to:
    determine a location associated with the user device; and
  where the one or more processors, when providing the data traffic, are to:
    provide the targeted advertisement based on the location of the user device.

7. The device of claim 6, where the targeted advertisement is associated with a business;
  where the one or more processors, when determining the location associated with the user device, are to:
    determine that the user device is within a threshold proximity of a business premises associated with the business; and
  where the one or more processors, when providing the data traffic, are further to:
    provide the targeted advertisement based on determining that the user device is within the threshold proximity.

8. A non-transitory computer-readable medium storing instructions, the instructions comprising:
  one or more instructions that, when executed by one or more processors of a device of a small cell long term evolution ("LTE") network, cause the one or more processors to:
    receive a request to provide data traffic;
    determine network information associated with a plurality of networks,
      the device being wirelessly connected to the plurality of networks,
      the plurality of networks including a macro cell LTE network and a fiber optic network, and
      the network information including information that identifies a condition of the plurality of networks;
    identify a particular network, of the plurality of networks, based on the network information,
      the particular network being identified as the macro cell LTE network or the fiber optic network based on one or more factors,
      the one or more factors including whether the request is for a media stream,
      the particular network being identified as the fiber optic network based on the request being for the media stream; and
    provide the data traffic, via the particular network, based on identifying the particular network.

9. The non-transitory computer-readable medium of claim 8, where the one or more instructions, that cause the one or more processors to determine the network information, cause the one or more processors to:
  determine that a first network, of the plurality of networks, is associated with a first level of congestion;
  determine that a second network, of the plurality of networks, is associated with a second level of congestion; and
  determine that the first level of congestion is greater than the second level of congestion; and
  where the one or more instructions, that cause the one or more processors to identify the particular network, cause the one or more processors to:
    identify the second network based on the one or more factors including the determination that the first level of congestion is greater than the second level of congestion.

10. The non-transitory computer-readable medium of claim 8, where the one or more instructions, when executed by the one or more processors, further cause the one or more processors to:
  determine a type of data traffic associated with the request; and
  where the one or more instructions, that cause the one or more processors to identify the particular network, cause the one or more processors to:
    identify the particular network based on the type of data traffic.

11. The non-transitory computer-readable medium of claim 8, where the one or more instructions, when executed by the one or more processors, further cause the one or more processors to:
  determine a quantity of bandwidth necessary to provide the data traffic;
  where the one or more instructions, that cause the one or more processors to determine the network information, cause the one or more processors to:
    determine a plurality of bandwidths associated with the plurality of networks; and
  where the one or more instructions, that cause the one or more processors to identify the particular network, further cause the one or more processors to:
    identify the particular network based on the plurality of bandwidths.

12. The non-transitory computer-readable medium of claim 8, where the one or more instructions, that cause the one or more processors to receive the request, cause the one or more processors to:
  receive the request from a user device; and
  where the one or more instructions, when executed by the one or more processors, further cause the one or more processors to:
    determine that the user device is capable of accessing the plurality of networks.

13. The non-transitory computer-readable medium of claim 8, where the data traffic is a video stream; and
  where the one or more instructions, that cause the one or more processors to provide the data traffic, cause the one or more processors to:

provide the video stream via the particular network using evolved multimedia broadcast multicast services ("eMBMS").

14. The non-transitory computer-readable medium of claim 13, where the one or more instructions, when executed by the one or more processors, further cause the one or more processors to:
   cause a content caching device to store a cache of the video stream for a period of time; and
   cause the content caching device to provide the video stream after the period of time.

15. A method, comprising:
   receiving, by a device associated with a small cell long term evolution ("LTE") network, a request to transmit data traffic associated with a user device,
      the user device communicating with the device via the small cell LTE network;
   determining, by the device, network information associated with a plurality of networks,
      the small cell LTE network being wirelessly connected to the plurality of networks,
      the plurality of networks including a macro cell LTE network and a fiber optic network, and
      the network information including information that identifies an attribute associated with the plurality of networks;
   identifying, by the device, a particular network, of the plurality of networks, based on the network information,
      the particular network being identified as the macro cell LTE network or the fiber optic network based on one or more factors,
         the one or more factors including whether the request is for a media stream,
            the particular network being identified as the fiber optic network based on the request being for the media stream,
               the media stream being stored in a content caching device; and
   transmitting, by the device, the data traffic, via the small cell LTE network and the particular network, based on identifying the particular network.

16. The method of claim 15, where the request is provided by a particular network device associated with the particular network; and
   where identifying the particular network comprises:
      identifying the particular network based on a determination that the request is provided by the particular network device.

17. The method of claim 15, where determining the network information comprises:
   determining a power management scheme; and
   where identifying the particular network comprises:
      identifying the particular network based on the power management scheme.

18. The method of claim 15, where determining the network information comprises:
   determining a cost associated with using the particular network; and
   where identifying the particular network comprises:
      identifying the particular network based on the cost.

19. The method of claim 15, where determining the network information comprises:
   determining a billing scheme associated with the user device; and
   where identifying the particular network comprises:
      identifying the particular network based on the billing scheme.

20. The method of claim 15, where transmitting the data traffic comprises:
   transmitting the data traffic to a cell device to cause the cell device to transmit the data traffic to the particular network.

* * * * *